United States Patent
Zhou et al.

(10) Patent No.: US 11,663,105 B2
(45) Date of Patent: May 30, 2023

(54) STRING PATTERN MATCHING FOR MULTI-STRING PATTERN RULES IN INTRUSION DETECTION

(71) Applicant: VMware, Inc., Palo Alto, CA (US)

(72) Inventors: Jingmin Zhou, Los Gatos, CA (US); Subrahmanyam Manuguri, San Jose, CA (US); Jayant Jain, Cupertino, CA (US); Anirban Sengupta, Saratoga, CA (US)

(73) Assignee: VMWARE, INC., Palo Alto, CA (US)

( * ) Notice: Subject to any disclaimer, the term of this patent is extended or adjusted under 35 U.S.C. 154(b) by 839 days.

(21) Appl. No.: 16/569,015

(22) Filed: Sep. 12, 2019

(65) Prior Publication Data

US 2021/0081461 A1 Mar. 18, 2021

(51) Int. Cl.
| | |
|---|---|
| *G06F 9/44* | (2018.01) |
| *G06F 11/30* | (2006.01) |
| *G06F 40/205* | (2020.01) |
| *G06V 10/94* | (2022.01) |

(52) U.S. Cl.
CPC ........ *G06F 11/3072* (2013.01); *G06F 40/205* (2020.01); *G06V 10/955* (2022.01)

(58) Field of Classification Search
None
See application file for complete search history.

(56) References Cited

U.S. PATENT DOCUMENTS

| | | | |
|---|---|---|---|
| 8,204,905 B2 * | 6/2012 | Kuo | G06F 16/951 707/780 |
| 9,842,112 B1 * | 12/2017 | Heer | G06F 16/148 |
| 2015/0095359 A1 * | 4/2015 | Duxbury | G06F 16/90344 707/758 |
| 2015/0310014 A1 * | 10/2015 | Yishay | G06F 16/951 707/728 |
| 2021/0081461 A1 * | 3/2021 | Zhou | G06F 11/3072 |

\* cited by examiner

*Primary Examiner* — Qamrun Nahar
(74) *Attorney, Agent, or Firm* — Adeli LLP

(57) ABSTRACT

In some embodiments, a method stores a plurality of identifiers for a plurality of rules. The plurality of rules each include a set of patterns, and a rule and a pattern combination is associated with an identifier in the plurality of identifiers. Information being sent on a network is scanned and the method determines when a pattern in the information matches a pattern for a rule. The method identifies an identifier for the pattern where the identifier identifies a rule and a pattern combination. Then, the method identifies the rule and the pattern combination based on the identifier. The set of patterns for the rule is found in the information based on determining that the rule and the pattern combinations for the rule have been found in the information.

21 Claims, 8 Drawing Sheets

300 →

| | 302-1 | 302-2 | 302-3 | 302-4 |
|---|---|---|---|---|
| Rule | Pattern #1 | Pattern #2 | Pattern #3 |
| R1 | ABC | DEF | XYZ |
| R2 | ABC | STY | |
| R3 | ENGLISH | FRENCH | |

400 →

| | 402-1 | 402-2 |
|---|---|---|
| PATTERN | IDENTIFIER |
| Rule R1/ABC | ID #1 |
| Rule R1/DEF | ID #2 |
| Rule R1/XYZ | ID #3 |
| Rule R2/ABC | ID #4 |
| Rule R2/STY | ID #5 |
| Rule R3/ENGLISH | ID #6 |
| Rule R3/FRENCH | ID #7 |

420 →

| 422-1 | 422-2 |
|---|---|
| Rule identifier | Pattern identifier |

500↘

| | ⌐502-1 | ⌐502-2 | ⌐502-3 |
|---|---|---|---|
| Rule R1/pattern 1 | 0...001 | 0...01 |
| Rule R1/pattern 2 | 0...001 | 0...10 |
| Rule R1/pattern 3 | 0...001 | 0...11 |
| Rule R2/pattern 1 | 0...010 | 0...01 |
| Rule R2/pattern 2 | 0...010 | 0...10 |
| Rule R3/pattern 1 | 0...011 | 0...01 |
| Rule R3/pattern 2 | 0...011 | 0...10 |

"XXX ... ABC ... DEF ... STY ... XYZ"

STRING PATTERN MATCHING FOR MULTI-STRING PATTERN RULES IN INTRUSION DETECTION

BACKGROUND

A computing system may perform multi-string pattern rule matching, such as a signature-based network intrusion detection system may detect one or more string patterns in a payload of packets. Each string pattern may include a number of characters, such as "ABC", "111", etc., and a rule may include multiple string patterns. The computer system may match data, such as data sent in a payload of a packet, against the string patterns in the rules. If a portion of the data includes all the patterns defined in a single rule, the computer system considers the rule a match and a corresponding action defined by the rule is taken. However, if the data only includes a portion of the string patterns defined by the rule (e.g., not all the patterns defined by the rule), the computer system does not consider the rule a match with the data.

The multiple string patterns defined by a rule may not follow a particular order. That is, the string patterns may be found in any order in the data. This means that the string patterns may not be combined into a single pattern using regular expressions. Rather, the computer system reviews the data for each of the string patterns of the rule, which may require multiple scans of the application data, which may take a large amount of time. When performing intrusion detection, detecting a packet that includes undesirable data is important and the speed at which the undesirable packet is detected is also important.

BRIEF DESCRIPTION OF THE DRAWINGS

FIG. 5 depicts an example of a table that shows identifiers for different rule and pattern combinations using bit strings according to some embodiments.

DETAILED DESCRIPTION

In the following description, for purposes of explanation, numerous examples and specific details are set forth in order to provide a thorough understanding of embodiments of the present disclosure. Some embodiments as expressed in the claims may include some or all of the features in these examples, alone or in combination with other features described below, and may further include modifications and equivalents of the features and concepts described herein.

Some embodiments analyze data for an occurrence of multiple patterns in a scan, such as in a single scan, of the data. Multiple rules may include one or more patterns, such as string patterns. For example, a first rule may include the string patterns of "ABC", "DEF", and "XYZ" and a second rule may include the string patterns of "ENGLISH" and "FRENCH". The data being analyzed should include all three of the string patterns for a match of the first rule to be determined and both of the string patterns for a match of the second rule.

The computer system may determine identifiers for the combinations of rule and associated patterns. For example, the combination of rule R1 and pattern #1 may be assigned a first identifier #1; the combination of rule R1 and pattern #2 may be assigned a second identifier #2; and the combination of rule R1 and pattern #3 may be assigned a third identifier #3. The identifier may identify the rule and the pattern of the rule uniquely.

The computer system then scans the data to determine whether or not any patterns from the rules are matched. When a pattern from the rule is matched, then the computer system determines the identifier for the pattern. From that identifier, the computer system can determine the rule and pattern. As the computer system analyzes the data, the computer system can keep track of which rule and pattern combinations are found in the data. When the computer system finds all patterns for a rule, the computer system determines that the rule has been matched. The computer system can then perform an action that is defined for the rule. The above analysis of the data requires a single scan of the data to determine a rule that includes multiple strings that match the data.

System Overview

Figure 1:
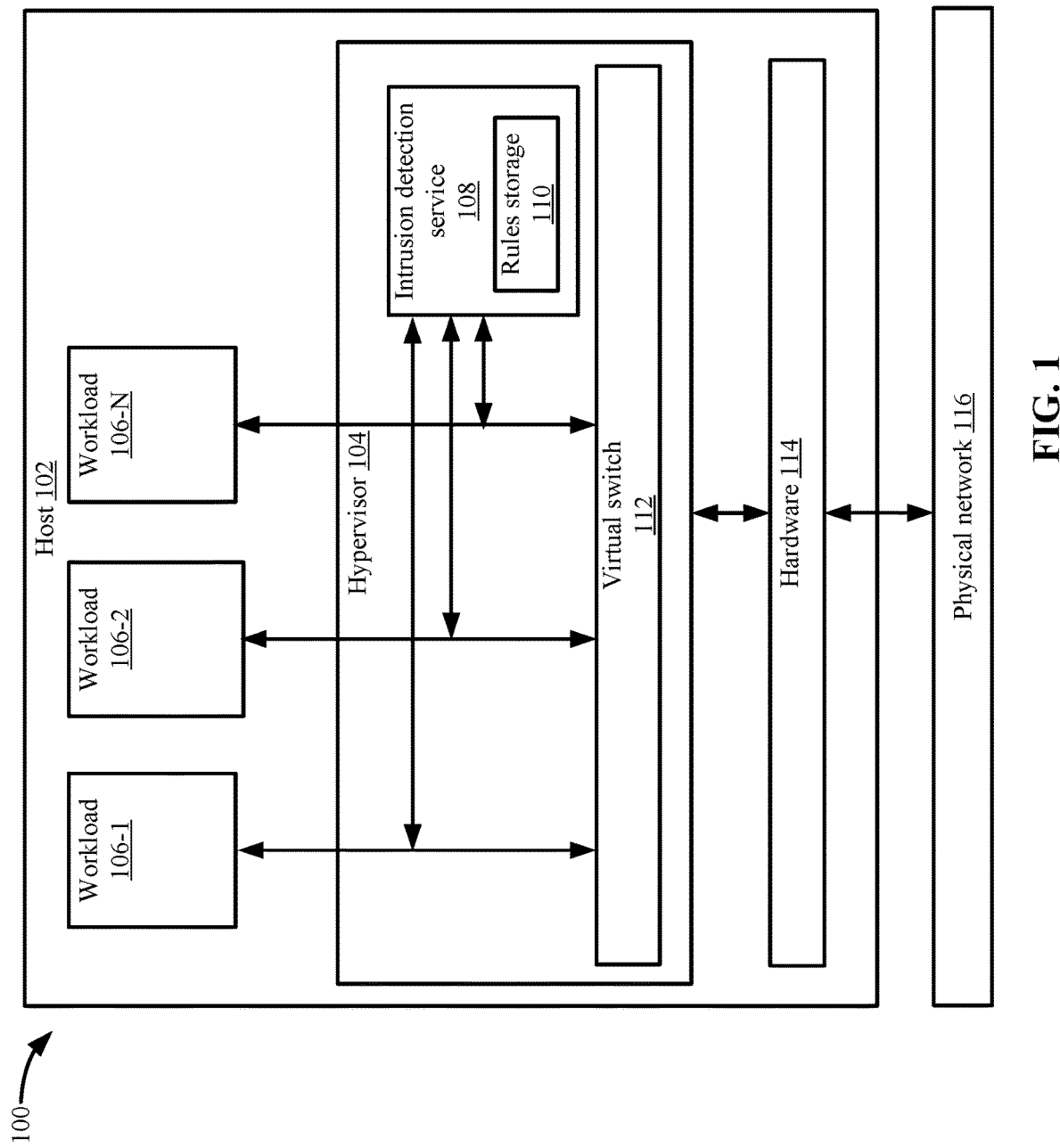
FIG. 1 depicts a simplified system for performing string matching according to some embodiments.

FIG. 1 depicts a simplified system 100 for performing string matching according to some embodiments. Hosts 102 may include workloads 106-1 to 106-N. Workloads may refer to virtual machines that are running on a respective host, but this is one example of a virtualized computing instance or compute node. Any suitable technology may be used to provide a workload. Workloads may include not only virtual machines, but also containers (e.g., running on top of a host operating system without the need for a hypervisor or separate operating system or implemented as an operating system level virtualization), virtual private servers, client computers, etc. The workloads may also be complete computation environments containing virtual equivalents of the hardware and software components of a physical computing system. Also, as used herein, the term hypervisor may refer generally to a software layer or component that supports the execution of multiple workloads including system-level software that supports name space containers.

Workloads 106-1 to 106-N may send and receive packets through virtual network interface cards (VNICs). The packets may be sent through a virtual switch 112 in hypervisor 104 to a physical network interface card (PNIC) in hardware 114. Then, packets are routed through physical network 116. Also, packets are received from physical network 116 at the PNIC, and sent through virtual switch 112 to VNICs of workloads 106.

An intrusion detection service 108 may intercept packets being sent between virtual switch 112 and workloads 106-1 to 106-N. In some embodiments, intrusion detection service 108 may be located in hypervisor 104. However, in other embodiments, intrusion detection service 108 may be located in other positions, such as in a workload 106 that is receiving the packets, in a separate workload, etc.

Intrusion detection service 108 may review the payload of the packets. Although the payload of the packets is described, intrusion detection service 108 may analyze any type of data. Further, intrusion detection service 108 may analyze the payload of the packets for strings of characters, but any pattern may be used. Also, intrusion detection service 108 does not need to be used in a virtualization environment. Rather, intrusion detection service 108 may be used in any system in which rules are being enforced for patterns.

Intrusion detection service 108 includes rules storage 110 that may store the rules that are to be applied to the payload of the packets. The rules may be stored such that intrusion detection service 108 can scan the payload of the packet with a single scan to determine if any of the rules match the payload. Rules storage 110 may also store information that is used to keep track of which patterns have been encountered in a payload, which will be described in more detail below.

Rule Processing

The rules may be defined by multiple patterns. Intrusion detection service 108 may process the rules to generate rule and pattern combinations. In other examples, intrusion detection service 108 may receive the rule and pattern combinations.

Figure 2:
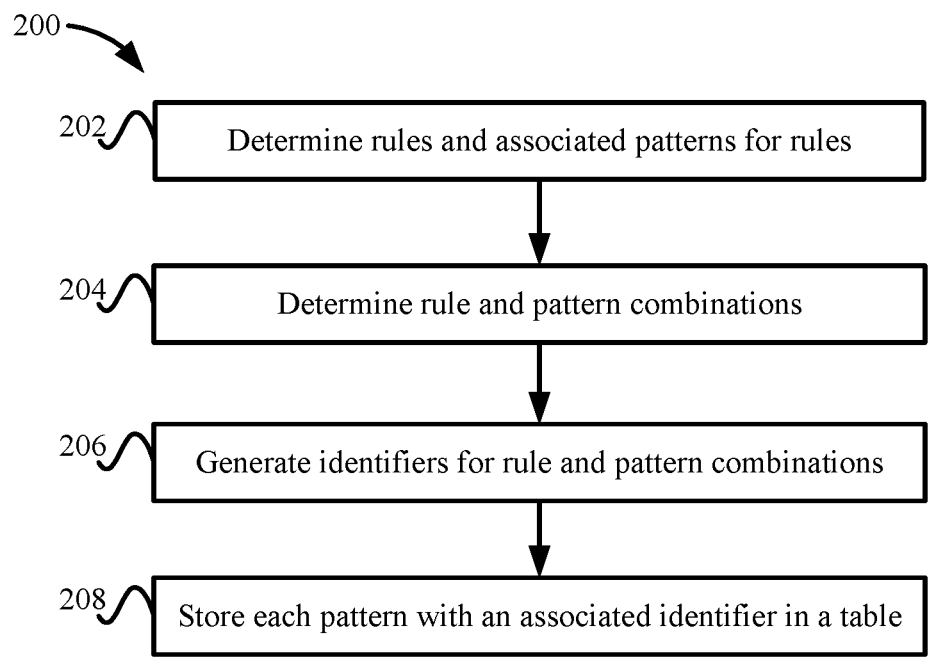
FIG. 2 depicts a simplified flowchart of a method for processing rules to generate rule and pattern combinations according to some embodiments.

FIG. 2 depicts a simplified flowchart 200 of a method for processing rules to generate rule and pattern combinations according to some embodiments. At 202, intrusion detection service 108 determines rules and associated patterns for the rules. As described above, multiple rules may be received where the rules may include one or more patterns.

Figures 3, 4A, 4B:
FIG. 3 depicts an example of a table that lists the rules and associated patterns according to some embodiments.
FIG. 4A shows an example of a table that lists the rule and pattern combinations and associated identifiers according to some embodiments.
FIG. 4B depicts an example of an identifier according to some embodiments.

FIG. 3 depicts an example of a table 300 that lists the rules and associated patterns according to some embodiments. A column 302-1 lists the rule. Then, columns 302-2 to 302-4 list associated patterns with each rule. It is noted that a rule may have one or more patterns associated with it, but at least one rule has more than one pattern. For example, rule R1 is associated with the patterns of "ABC", "DEF", and "XYZ". Rule R2 is associated with two patterns of "ABC" and "STY". Rule R3 is also associated with two patterns of "ENGLISH" and "FRENCH".

Accordingly, for a payload to match rule R1, the payload should include the patterns of "ABC", "DEF", and "XYZ" in any order. Similarly, for a payload to match rule R2, the payload should include the patterns of "ABC" and "STY" in any order.

Referring back to FIG. 2, at 204, intrusion detection service 108 determines rule and pattern combinations. A rule and pattern combination identifies a rule and an associated pattern for that rule. Once determining the rule and pattern combinations, at 206, intrusion detection service 108 generates identifiers for the rule and pattern combinations. For example, each rule and pattern combination may be associated with a different identifier. At 208, intrusion detection service 108 stores each pattern with an associated identifier in a table. For example, each pattern may be associated with the identifier. FIG. 4A shows an example of a table 400 that lists the rule and pattern combinations and associated identifiers according to some embodiments. A column 402-1 lists a rule and pattern combination and a column 402-2 lists the associated identifier for the pattern. For example, the pattern "ABC" for rule R1 may have an identifier of ID #1. Also, the patterns "DEF" and "XYZ" for rule R1 may be associated with the identifiers ID #2 and ID #3, respectively. Rule R2 includes the same pattern as Rule R1 of "ABC", but this is a different rule and pattern combination and the pattern "ABC" for rule R2 is assigned the identifier ID #4. The other patterns for rules R1 and R3 are also assigned identifiers.

Each pattern for a rule is assigned a different identifier because the identifier may be used to identify a rule and a pattern combination. For example, FIG. 4B depicts an example of an identifier according to some embodiments. Identifier 420 may include a first portion 422-1 that identifies the rule and a second portion 422-2 that identifies the pattern. For example, the rule identifier may identify rule R1 and the pattern identifier may identify pattern "ABC" for identifier ID #1. Identifier ID #2 may identify rule R1 and pattern "DEF". Identifier ID #4 may identify rule R2 and pattern "ABC". Different methods may be used to identify the rule and pattern. For example, bit patterns may be used to identify the rule and pattern combinations. FIG. 5 depicts an example of a table 500 that shows identifiers for different rule and pattern combinations using bit strings according to some embodiments. Although bit strings are described, other values may be used.

In table 500, a column 502-1 identifies a rule and pattern combination, and columns 502-2 and 502-3 show the portion of the identifier. For example, column 502-2 shows the bits for the rule identifier and column 502-3 shows the bits for the pattern identifier. Each rule and pattern combination may include a different combination of bits.

In some embodiments, the identifier may be a 32-bit integer identifier where 26 bits are dedicated to the rule identifier and 6 bits are dedicated to the pattern identifier for the rule. In this example, a 26-bit identifier means there can be around $2^64=678108864$ unique rules and a 6-bit identifier means there can be up to 64 unique string patterns for the rule. Although the above number of bits are described, it will be understood that a different number of bits and combinations of bits may be used for the rule identifier and the pattern identifier.

In table 500, the combination of rule R1 and pattern #1 may be associated with a rule identifier of 0 . . . 01 and a pattern identifier of 0 . . . 01. That is, 26 bits for the rule identifier may be associated with 25 values of "0" and one value of "1", and the 6 bits for the pattern identifier may be associated with "000001". Also, the combination of rule R1 and pattern #2 may be associated with the rule identifier of 26 bits of "0 . . . 01" and the pattern identifier of six bits of "0 . . . 10". When rule R2 is encountered, the combination of rule R2 and pattern #1 may be associated with the rule identifier of 26 bits of "0 . . . 10" and the pattern identifier of six bits of "0 . . . 01". This increments the rule identifier bit string and resets the bit string pattern identifier for rule R2. As can be seen, each combination of rule and pattern may be associated with a different combination of bits. Accordingly, intrusion detection service 108 can uniquely identify a rule and pattern from the identifier.

Once determining the rule and pattern identifiers, intrusion detection service 108 can analyze a payload of a packet for data that matches at least one of the rules.

Pattern Matching Process

Figure 6:
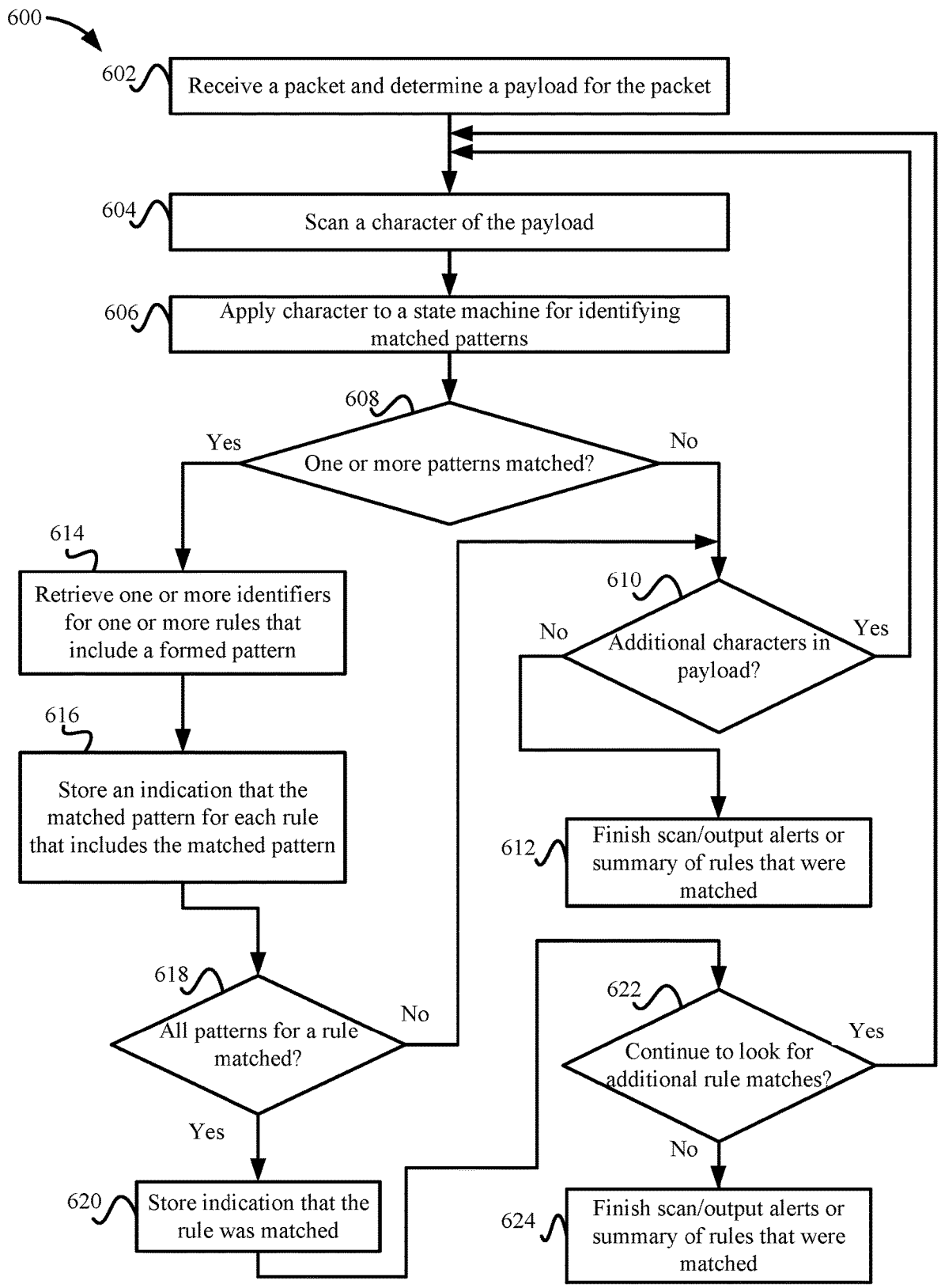
FIG. 6 depicts a simplified flowchart of a method for processing a payload of a packet according to some embodiments.
Figures 7A, 7B:
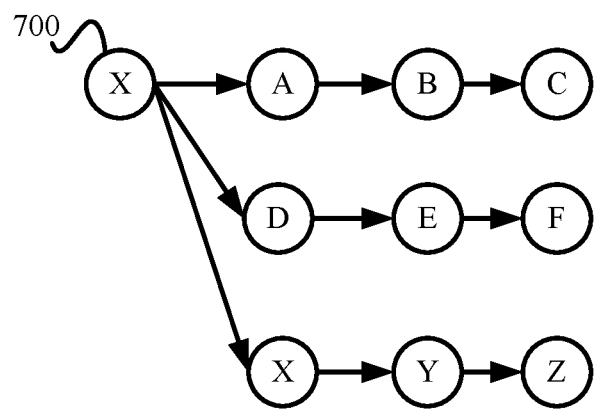
FIG. 7A depicts an example of a payload of a packet according to some embodiments.
FIG. 7B depicts an example of a state machine according to some embodiments.

FIG. 6 depicts a simplified flowchart 600 of a method for processing a payload of a packet according to some embodiments. At 602, intrusion detection service 108 receives a packet and determines a payload for the packet. In some embodiments, any portion of the packet may constitute the payload and be analyzed. For example, intrusion detection service 108 may analyze the header and payload of a packet. FIG. 7A depicts an example of a payload of a packet according to some embodiments. The payload of the packet includes the characters of "XXX . . . ABC . . . DEF . . . STY . . . XYZ".

Referring back to FIG. 6, at 604, intrusion detection service 108 scans a character of the payload. The character may be any information from the payload. For example, intrusion detection service 108 starts at the first character of "X". At 606, intrusion detection service 108 applies the character to a state machine for identifying matched patterns. Although a state machine is discussed, other methods for identifying matches will be appreciated. At 608, intrusion detection service 108 determines whether one or more patterns are matched in table 400.

Intrusion detection service 108 may use different methods to determine when a pattern matches data in the payload. In some embodiments, the pattern is a list of characters that should be found in consecutive order in the payload. In some embodiments, intrusion detection service 108 may use a state machine or a finite state automata. As each character of the payload is analyzed, intrusion detection service 108 may change the state for any number of finite state machines that apply to the character. FIG. 7B depicts an example of a state machine according to some embodiments. When intrusion detection service 108 encounters a character, intrusion detection service 108 determines whether a state in a finite state machine should be changed. At 700, the finite state machines are initialized. When intrusion detection service 108 detects that a letter "A" is encountered in the payload, intrusion detection service 108 changes the state of a finite state machine to indicate that the letter A is received. After the letter "B" is received, intrusion detection service 108 changes the state from the finite state machine to indicate the letters "A" and "B" have been received. Finally, the letter "C" is received. Next, intrusion detection service 108 changes the state of the finite state machine to indicate the letter C has been received. If the letters "A", "B", and "C" are received consecutively, then intrusion detection service 108 determines that the identifiers associated with the pattern "ABC" have been matched. Alternatively, if the character "D" is encountered, intrusion detection service 108 changes the state of a finite state machine to indicate that the letter "D" is received. The above processing may continue until intrusion detection service 108 determines a match and/or reviews the entire payload.

Referring back to FIG. 6, if no matched patterns are found, at 610, intrusion detection service 108 determines if there are additional characters in the payload. If not, at 612, intrusion detection service 108 finishes the scan and may output a summary of rules that were matched or output any alerts for rules that were matched if not already done so. If the scan is not finished, then the process reiterates to continue scanning another character at 604.

When one or more patterns are matched, at 614, intrusion detection service 108 retrieves one or more identifiers for one or more rules that include a formed pattern. For example, using the example, in FIG. 7A, the first pattern that is matched in the payload is a string of "ABC". The string of "ABC" in table 400 is associated with the identifier of ID #1 and the identifier of ID #4. This is because the string of "ABC" is found in both rule R1 and rule R2. At 616, intrusion detection service 108 stores an indication that the pattern for the rule has been matched. For example, as patterns are matched for rules, intrusion detection service 108 may keep track of which patterns for which rules have been matched. In some embodiments, intrusion detection service 108 sets a bit in a first data structure that stores which patterns have been matched to a payload for a rule.

At 618, intrusion detection service 108 determines if all patterns for a rule have been matched. If not, the process continues to 610 to determine if there are additional characters in the payload. However, if all patterns for a rule are matched, at 620, intrusion detection service 108 stores an indication that the rule was matched. Alternatively, intrusion detection service 108 may output an alert. Further, if intrusion detection service 108 is only looking for a first match of a rule, intrusion detection service 108 may stop the scan of the payload. For example, at 622, intrusion detection service 108 determines whether to continue to look for additional rule matches. If not, at 624, intrusion detection service 108 finishes the scan and may output a summary of rules that were matched or output any alerts for rules that were matched if not already done so. However, if intrusion detection service 108 is going to scan the entire payload, the process proceeds to 604 to scan the payload for another character.

Intrusion detection service 108 may keep track of the rules that are matched using different methods. In some embodiments, intrusion detection service 108 may use a bit mask to detect when all patterns for a rule have been matched. FIGS. 8A to 8D depict an example of a matching process using bit masks according to some embodiments. A bit array may be a contextual object that may define which patterns for a rule have been found in the payload. Each bit in the bit array may represent a pattern defined by the rule. For example, if a rule defines seven patterns, then bit array 804 may be the size of seven bits. If a particular bit in the bit array is zero, then this means that the corresponding pattern for that bit has not been found in the payload yet. If the bit is set to one, this means that the corresponding pattern for this bit has been found in the payload. Accordingly, if the first pattern in a rule is found in the payload, a first bit in the bit array is set to one. When all bits of the bit array are set to one, then the payload includes all patterns of the rule.

A bit mask for the rules is shown at 802-1 to 802-3. For example, a bit is set in bit mask 802 based on the number of patterns found for a rule. For example, rule R1 includes three patterns and three bits are set in bit mask 802-1. Rule R2 includes two patterns and two bits are set in bit mask 802-2. Similarly, rule R3 includes two patterns and two bits are set in bit mask 802-3.

At the initialization of the pattern match process of a payload, all bits of the bit array for rules at 804-1 to 804-3 are set to zero. When a rule and pattern combination is matched, intrusion detection service 108 sets an appropriate bit. Each position in the bit mask and the bit array may correspond to the rule and pattern combination. For example, a position 806-1 corresponds to the first pattern of "ABC" for rule R1; the second position at 806-2 corresponds to the second pattern for rule R1 of "DEF"; and the third position at 806-3 corresponds to the third pattern of rule R1 of "XYZ".

In the process of scanning the payload of the packet in FIG. 7A, intrusion detection service 108 encounters the pattern of "XXX". The pattern of "XXX" does not match any patterns for the rules and intrusion detection service 108 does not set any bits in bit arrays 804. Next, intrusion detection service 108 counters the pattern of "ABC", which corresponds to a rule and pattern combination for rule R1 and rule R2. The pattern is matched is the first position for both rule R1 and rule R2, and intrusion detection service 108 sets a bit in position 806-1 of the bit array 804-1 for rule R1 and bit array 804-2 for rule R2.

After each match, intrusion detection service 108 may then compare bit array 804 to the corresponding bit mask 802 whenever inserting a bit into a bit array. For example, intrusion detection service 108 compares bit array 804-1 for rule R1 to bit mask 802-1 for rule R1. Because bit array 804-1 for rule R1 does not have bits at 806-2 and 806-3 set, bit array 804-1 does not equal bit mask 802-1. For rule R2, intrusion detection service 108 determines that bit array 804-2 for rule R2 does not equal bit mask 802-2 for rule R2 because bit array 804-2 is missing the second bit at 806-2.

Next, intrusion detection service 108 determines the pattern "DEF" in the payload. The pattern "DEF" matches the second pattern for rule R1. In this case, in FIG. 8B, intrusion detection service 108 sets the bit in the second position for bit array 804-1 at 806-2. Now, the bit array at 804-1 for rule R1 includes two bits that are set.

Intrusion detection service 108 may compare the bit array 804-1 to the bit mask 802-1. As seen, the bit array 804-1 does not match the bits in bit mask R1 802-1. That is, the third bit is not set in bit array 804-1.

Figure 8A:
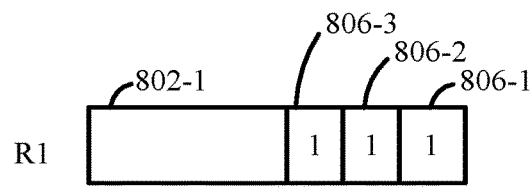
FIGS. 8A to 8D depict an example of a matching process using bit masks according to some embodiments.
Figure 8A:
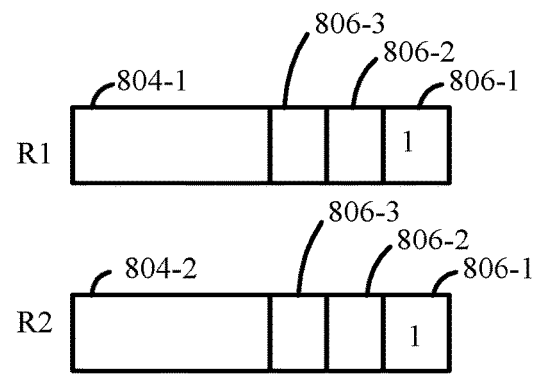
Figure 8A:
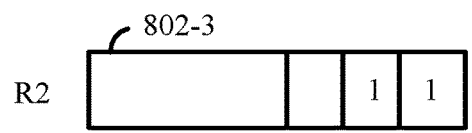
Figure 8A:
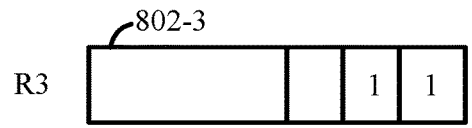
Figure 8B:
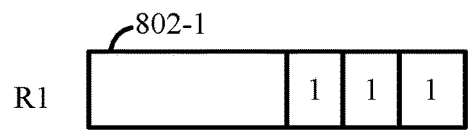
Figure 8B:
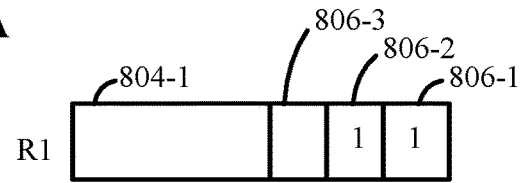
Figure 8B:
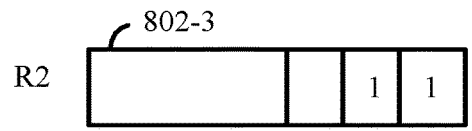
Figure 8B:
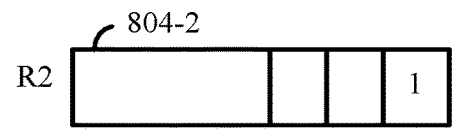
Figure 8B:
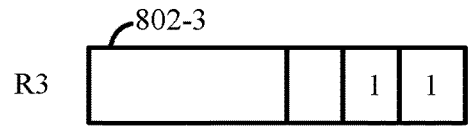
Figure 8B:
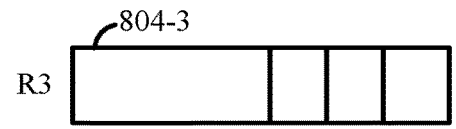
Figure 8C:
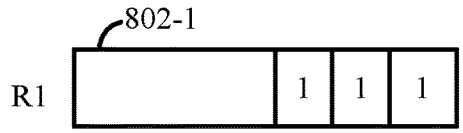
Figure 8C:
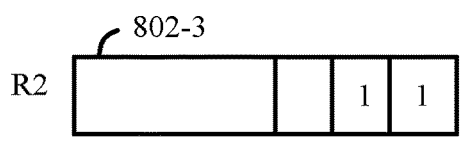
Figure 8C:
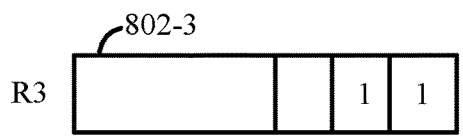
Figure 8C:
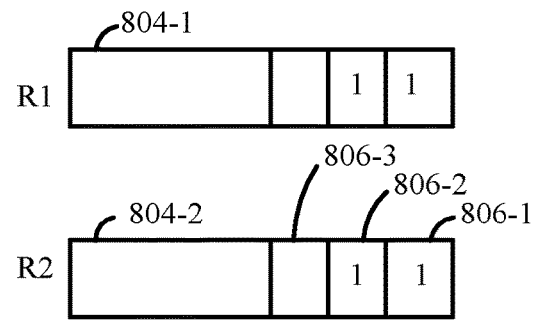

Intrusion detection service 108 then encounters the string "STY", which matches a pattern in rule R2. In FIG. 8C, the pattern "STY" matches the second pattern for rule R2 and intrusion detection service 108 sets the second bit in bit array 804 at 806-2. Then, intrusion detection service 108 compares bit array 804-2 to bit mask 802-2. In this case, the bits in bit array 804-2 match the bits set in bit mask 802-2. At this point, intrusion detection service 108 can determine that rule R2 has been matched by patterns in the payload.

Intrusion detection service 108 may then perform an action associated with rule R2 according to some embodiments. For example, intrusion detection service 108 may output an alert. At this point, intrusion detection service 108 may stop the scanning of the payload because a rule has been matched. However, intrusion detection service 108 may continue to scan the payload to determine if other rules have patterns that match the payload.

Figure 8D:
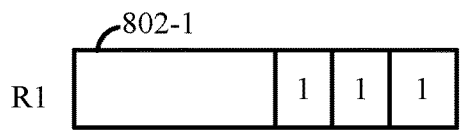
Figure 8D:
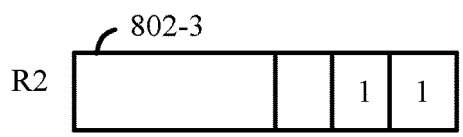
Figure 8D:
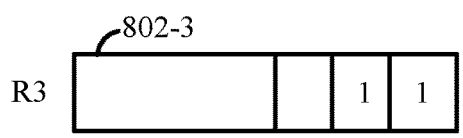
Figure 8D:
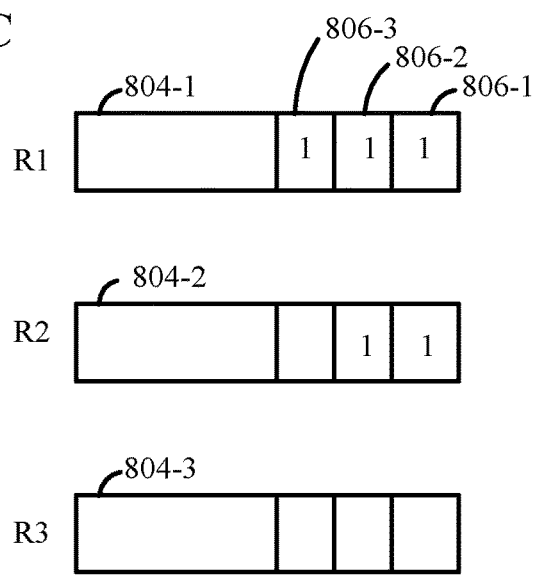

Intrusion detection service 108 detects the string "XYZ", which equals the third pattern in rule R1. In FIG. 8D, intrusion detection service 108 sets the third bit in bit array 804-1 at 806-3. Then, intrusion detection service 108 compares bit array 804-1 to bit mask 802-1 for rule R1. The bits set in bit array 804-1 match the bits set in bit array 802-1 and thus intrusion detection service 108 determines that a match of the patterns in rule R1 has been found in the payload of the packet. As with rule R2, intrusion detection service 108 can perform an action that is defined for rule R1.

Although the above is described with a bit array and bit mask, other implementations may be used. For example, integer values may be generated and used to determine if a rule has been matched. For example, if the value of the bit array reaches an integer value, the rule may be considered a match. If a rule with seven patterns is associated with a seven-bit bit array, when all bits are set to one, the bit array may be represented by an integer value of 0x7f. Accordingly, when the value of the bit array reaches the integer value 0x7f, intrusion detection service 108 considers the rule a match.

CONCLUSION

Accordingly, intrusion detection service 108 can determine whether any of the rules that include one or more patterns are matched during a single scan of a payload of a packet. This avoids having to scan the payload multiple times for each rule or scanning multiple patterns for the rules in parallel. Rather, some embodiments more efficiently perform the analysis using rule and pattern combinations that are associated with identifiers that can identify the rule and the pattern.

Embodiments

In some embodiments, a method includes: storing, by a computing device, a plurality of identifiers for a plurality of rules, wherein the plurality of rules each include a set of patterns, and wherein a rule and a pattern combination is associated with an identifier in the plurality of identifiers; scanning, by a computing device, information being sent on a network; determining, by the computing device, when a pattern in the information matches a pattern for a rule; identifying, by the computing device, an identifier for the pattern, wherein the identifier identifies a rule and a pattern combination; identifying, by the computing device, the rule and the pattern combination based on the identifier; and determining, by the computing device, when the set of patterns for the rule is found in the information based on determining that the rule and the pattern combinations for the rule have been found in the information.

In some embodiments, determining the set of patterns for the rule is found in the information is based on a single scan of characters in the information in order.

In some embodiments, the identifier for the pattern includes a first portion of information that identifies the rule and a second portion of information that identifies the pattern in the rule and the pattern combination.

In some embodiments, the method further includes: storing a first indicator that indicates the pattern of the rule is included in the information; and determining when all indicators for patterns in the set of patterns for the rule have been determined.

In some embodiments, when the set of patterns for the rule is found in the information, performing an action associated with the rule.

In some embodiments, the method each rule and pattern combination for the plurality of rules is associated with a unique identifier.

In some embodiments, the method further includes: continuing to scan the information to determine another pattern that is found in the information until the set of patterns for the rule is found in the information.

In some embodiments, a non-transitory computer-readable storage medium contains instructions, that when executed, control a computer system to be operable for: storing a plurality of identifiers for a plurality of rules, wherein the plurality of rules each include a set of patterns, and wherein a rule and a pattern combination is associated with an identifier in the plurality of identifiers; scanning information being sent on a network; determining when a pattern in the information matches a pattern for a rule; identifying an identifier for the pattern, wherein the identifier identifies a rule and a pattern combination; identifying the rule and the pattern combination based on the identifier; and determining when the set of patterns for the rule is found in the information based on determining that the rule and the pattern combinations for the rule have been found in the information.

In some embodiments, determining the set of patterns for the rule is found in the information is based on a single scan of characters in the information in order.

In some embodiments, the identifier for the pattern includes a first portion of information that identifies the rule and a second portion of information that identifies the pattern in the rule and the pattern combination.

In some embodiments, the method is further configured for: storing a first indicator that indicates the pattern of the rule is included in the information; and determining when all indicators for patterns in the set of patterns for the rule have been determined.

In some embodiments, when the set of patterns for the rule is found in the information, performing an action associated with the rule.

In some embodiments, each rule and pattern combination for the plurality of rules is associated with a unique identifier.

In some embodiments, the method is further configured for: continuing to scan the information to determine another pattern that is found in the information until the set of patterns for the rule is found in the information.

In some embodiments, an apparatus includes: one or more computer processors; and a non-transitory computer-readable storage medium includes instructions, that when executed, control the one or more computer processors to be operable for: storing a plurality of identifiers for a plurality of rules, wherein the plurality of rules each include a set of patterns, and wherein a rule and a pattern combination is associated with an identifier in the plurality of identifiers; scanning information being sent on a network; determining when a pattern in the information matches a pattern for a rule; identifying an identifier for the pattern, wherein the identifier identifies a rule and a pattern combination; identifying the rule and the pattern combination based on the identifier; and determining when the set of patterns for the rule is found in the information based on determining that the rule and the pattern combinations for the rule have been found in the information.

In some embodiments, determining the set of patterns for the rule is found in the information is based on a single scan of characters in the information in order.

In some embodiments, the identifier for the pattern includes a first portion of information that identifies the rule and a second portion of information that identifies the pattern in the rule and the pattern combination.

In some embodiments, the method is further configured for: storing a first indicator that indicates the pattern of the rule is included in the information; and determining when all indicators for patterns in the set of patterns for the rule have been determined.

In some embodiments, when the set of patterns for the rule is found in the information, performing an action associated with the rule.

In some embodiments, each rule and pattern combination for the plurality of rules is associated with a unique identifier.

In some embodiments, the method is further configured for: continuing to scan the information to determine another pattern that is found in the information until the set of patterns for the rule is found in the information.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of embodiments. In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise.

Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:
storing, by a computing device, a plurality of identifiers for a plurality of rules, wherein the plurality of rules each includes a set of patterns, wherein a rule and a pattern combination is associated with an identifier in the plurality of identifiers;
scanning, by the computing device, information being sent on a network;
determining, by the computing device, when a pattern in the information matches a pattern in the set of patterns for a rule;
identifying, by the computing device, an identifier for the pattern, wherein the identifier identifies the rule and the pattern combination;
identifying, by the computing device, the rule and the pattern combination based on the identifier; and
determining, by the computing device, when the set of patterns for the rule is found in the information based on determining that the rule and the pattern combinations for the rule have been found in the information.

2. The method of claim 1, wherein determining the set of patterns for the rule is found in the information is based on a single scan of characters in the information in order.

3. The method of claim 1, wherein the identifier for the pattern includes a first portion of information that identifies the rule and a second portion of information that identifies the pattern in the rule and the pattern combination.

4. The method of claim 1, further comprising:
storing a first indicator that indicates the pattern of the rule is included in the information; and
determining when all indicators for patterns in the set of patterns for the rule have been determined.

5. The method of claim 1, wherein when the set of patterns for the rule is found in the information, performing an action associated with the rule.

6. The method of claim 1, wherein each rule and pattern combination for the plurality of rules is associated with a unique identifier.

7. The method of claim 1, further comprising:
continuing to scan the information to determine another pattern that is found in the information until the set of patterns for the rule is found in the information.

8. A non-transitory computer-readable storage medium containing instructions, that when executed, control a computer system to be operable for:
storing a plurality of identifiers for a plurality of rules, wherein the plurality of rules each include a set of patterns, wherein a rule and a pattern combination is associated with an identifier in the plurality of identifiers;
scanning information being sent on a network;
determining when a pattern in the information matches a pattern in the set of patterns for a rule;
identifying an identifier for the pattern, wherein the identifier identifies the rule and the pattern combination;
identifying the rule and the pattern combination based on the identifier; and
determining when the set of patterns for the rule is found in the information based on determining that the rule and the pattern combinations for the rule have been found in the information.

9. The non-transitory computer-readable storage medium of claim 8, wherein determining the set of patterns for the rule is found in the information is based on a single scan of characters in the information in order.

10. The non-transitory computer-readable storage medium of claim 8, wherein the identifier for the pattern includes a first portion of information that identifies the rule and a second portion of information that identifies the pattern in the rule and the pattern combination.

11. The non-transitory computer-readable storage medium of claim 8, further configured for:
storing a first indicator that indicates the pattern of the rule is included in the information; and
determining when all indicators for patterns in the set of patterns for the rule have been determined.

12. The non-transitory computer-readable storage medium of claim 8, wherein when the set of patterns for the rule is found in the information, performing an action associated with the rule.

13. The non-transitory computer-readable storage medium of claim 8, wherein each rule and pattern combination for the plurality of rules is associated with a unique identifier.

14. The non-transitory computer-readable storage medium of claim 8, further configured for:
continuing to scan the information to determine another pattern that is found in the information until the set of patterns for the rule is found in the information.

15. An apparatus comprising:
one or more computer processors; and
a non-transitory computer-readable storage medium comprising instructions, that when executed, control the one or more computer processors to be operable for:
storing a plurality of identifiers for a plurality of rules, wherein the plurality of rules each include a set of patterns, wherein a rule and a pattern combination is associated with an identifier in the plurality of identifiers;
scanning information being sent on a network;
determining when a pattern in the information matches a pattern in the set of patterns for a rule;
identifying an identifier for the pattern, wherein the identifier identifies the rule and the pattern combination;
identifying the rule and the pattern combination based on the identifier; and
determining when the set of patterns for the rule is found in the information based on determining that the rule and the pattern combinations for the rule have been found in the information.

16. The apparatus of claim 15, wherein determining the set of patterns for the rule is found in the information is based on a single scan of characters in the information in order.

17. The apparatus of claim 15, wherein the identifier for the pattern includes a first portion of information that identifies the rule and a second portion of information that identifies the pattern in the rule and the pattern combination.

18. The apparatus of claim 15, further configured for:
    storing a first indicator that indicates the pattern of the rule is included in the information; and
    determining when all indicators for patterns in the set of patterns for the rule have been determined.

19. The apparatus of claim 15, wherein when the set of patterns for the rule is found in the information, performing an action associated with the rule.

20. The apparatus of claim 15, wherein each rule and pattern combination for the plurality of rules is associated with a unique identifier.

21. The apparatus of claim 15, further configured for:
    continuing to scan the information to determine another pattern that is found in the information until the set of patterns for the rule is found in the information.

\* \* \* \* \*